United States Patent [19]

Kish

[11] Patent Number: 4,712,307
[45] Date of Patent: Dec. 15, 1987

[54] RAFTER ANGLE MEASURING DEVICE

[76] Inventor: Karl E. Kish, 17611 Hamlin St., Van Nuys, Calif. 91406

[21] Appl. No.: 30,558

[22] Filed: Mar. 27, 1987

[51] Int. Cl.[4] .......................... B43L 7/06; B43L 13/00
[52] U.S. Cl. ...................................... 33/421; 33/423; 33/451
[58] Field of Search .................. 33/416, 417, 418, 420, 33/421, 423, 424, 451, 471

[56] References Cited

U.S. PATENT DOCUMENTS

| 518,103 | 4/1894 | Hodge | 33/423 |
| 614,985 | 11/1898 | Ruffin | 33/421 |
| 745,271 | 11/1903 | Bones | 33/423 |
| 820,311 | 5/1906 | Oehrle | 33/420 |
| 861,581 | 7/1907 | Field et al. | 33/425 |
| 894,770 | 7/1908 | Wood | 33/425 |
| 1,084,973 | 1/1914 | Stanwood et al. | 33/423 |
| 1,237,721 | 8/1917 | Stanley | 33/423 |
| 1,521,980 | 1/1925 | Zook | 33/423 |
| 1,628,447 | 5/1927 | Attaway | 33/456 |
| 1,913,919 | 6/1933 | Dion | 33/423 |
| 2,251,208 | 7/1941 | Sigmon | 33/423 |
| 2,461,795 | 2/1949 | Williamson | 33/424 |
| 2,504,244 | 4/1950 | Barclay | 33/424 |
| 2,908,080 | 10/1959 | Varbel | 33/423 |

FOREIGN PATENT DOCUMENTS

| 747457 | 9/1944 | Fed. Rep. of Germany | 33/418 |
| 336963 | 3/1904 | France | 33/421 |

Primary Examiner—Richard R. Stearns
Attorney, Agent, or Firm—John J. Posta, Jr.

[57] ABSTRACT

The rafter angle device includes a body in the form of a generally U-shaped plate of metal or the like having a horizontal base and spaced first and second vertical arms at opposite ends thereof. A third arm is pivotally connected to the plate at about the end of the base bearing the first arm and extends beyond the second arm. The third arm may releasably receive and is releasably securable to at least one of the first and second arms in any position between about horizontal and vertical, as by a locking nut. The first arm has a generally triangular support portion secured to the base about halfway along the length thereof and defining a spaced pair of curved slots, with angle, hip rafter valve and common jack plumb cut indicia disposed along the perimeter of the slots thereof. The support portion may also bear door sill and window sill indicia, while at least one margin of each of the three arms and base bear linear indicia in fractions of an inch. The third arm has a bubble level in a cage so as to be releasable from all major angles. The base is adapted to measure roof rafter angles and also serves as a U-square.

9 Claims, 3 Drawing Figures

RAFTER ANGLE MEASURING DEVICE

BACKGROUND OF THE INVENTION

1. Field of the Invention

The present invention generally relates to measuring devices and, more particularly, to an improved device for measuring roof rafter angles and other angles.

2. Prior Art

Various devices have been designed in the past to measure angles and distances for carpentry purposes, for example, roof rafter angles and the like. Certain of such devices are shown in U.S. Pat. Nos. 1,628,447, 2,461,795, 518,103, 861,581, 2,908,080, 1,084,973, 1,237,721, 2,504,244, 745,271, 894,770, 1,913,919 and the like. Many of those devices are complicated, expensive and of limited utility. Certain other devices, such as levels, are utilized to locate horizontal and vertical positions. Such devices are of specialized nature and must be used in addition to other tools and instruments for setting window and door sills and the like.

There remains a need for a simple, durable, inexpensive, multi-purpose device which is capable of accurately measuring angles for roof rafters, door and window sills and walls, and also is capable of checking horizontal and vertical phones and, in addition, is capable of measuring small linear distances. Such a device should be compact, portable, easy and rapid to use and not require the use of any additional or supplemental instruments.

SUMMARY OF THE INVENTION

The improved device of the present invention satisfies all the foregoing needs. The device is substantially as set forth in the accompanying Abstract. Thus, the device includes a generally U-shaped plate with a horizontal base and first and second vertical arms at opposite ends thereof. The first arm has a level-bearing third arm pivotably connected thereto for rotation between an about horizontal and a vertical position. The first arm may include a generally triangular support portion having a pair of curved slots marked along their perimeters with indicia denoting the angle of the third arm, hip rafter valves, and common angles for peak plumb cuts. The triangular portion may also be marked for door sill and window sill angles. The third arm may be slotted to slideably receive the first two arms and to facilitate releasably pinning the third arm in any given position relative to the plate, as by a threaded screw or bolt passing transversely through the third arm. The level in the third arm is disposed in a cage viewable from all major angles.

In one use of the device, the base of the plate may be first disposed against the top or underside of an existing roof or roof rafter top and the third arm is then pivoted until it is in the horizontal position, whereupon it is locked in place. The rafter angle is then read off of the triangular portion of the plate. In a second use, when it is desired to check both sides of a vertical opening for squareness, the third arm can be locked into a vertical position, so that the third arm forms one extended vertical side of a box, while the second arm forms the other vertical arm of the box and the base is the horizontal bottom of the box. The opening can then be visually sighted for squareness and/or physically measured. Various other advantages of the invention are set forth in the following detailed description and accompanying drawings.

DRAWINGS

DETAILED DESCRIPTION

FIGS. 1–3

Figure 1:
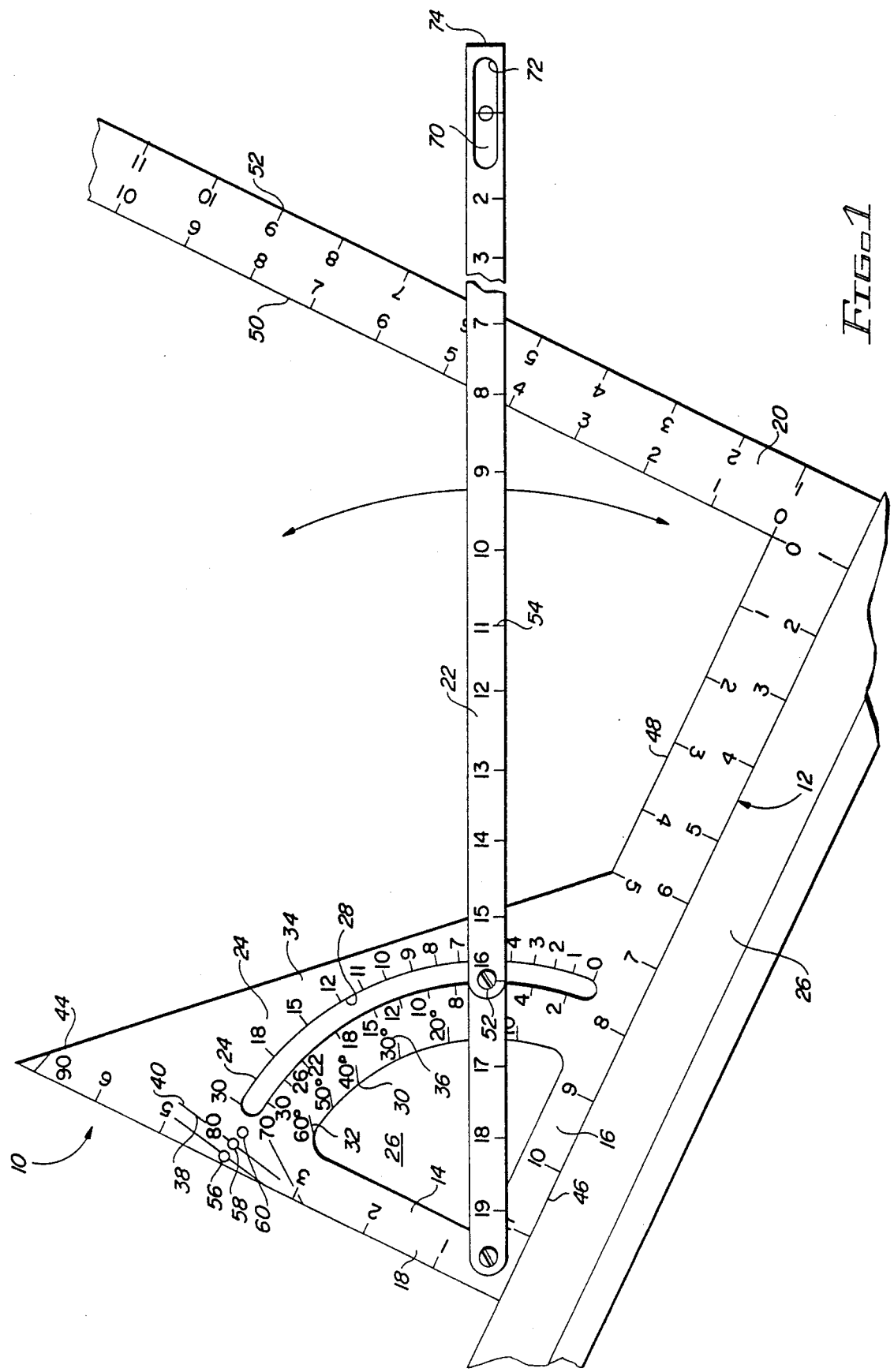
FIG. 1 is a schematic side elevation, partly broken away, of a first preferred embodiment of the improved rafter measuring device of the present invention, shown disposed against the top of the roof for measuring the angle thereof.
Figure 2:
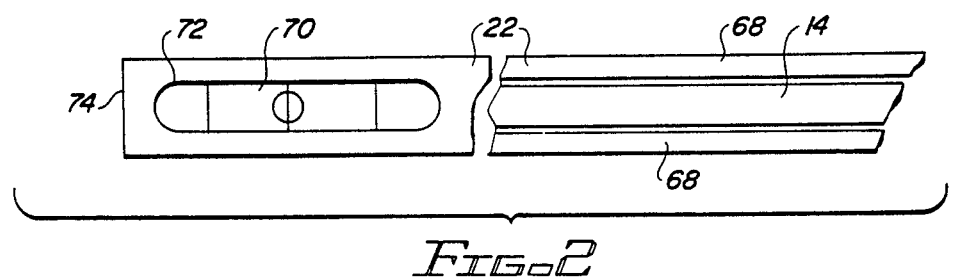
FIG. 2 is an enlarged, fragmentary schematic top plan view of the level-containing portion of the third arm of the device of FIG. 1; and, FIG. 3 is a reduced, schematic side elevation of the device of FIG. 1, shown with the third arm in the locked vertical position.
Figure 3:
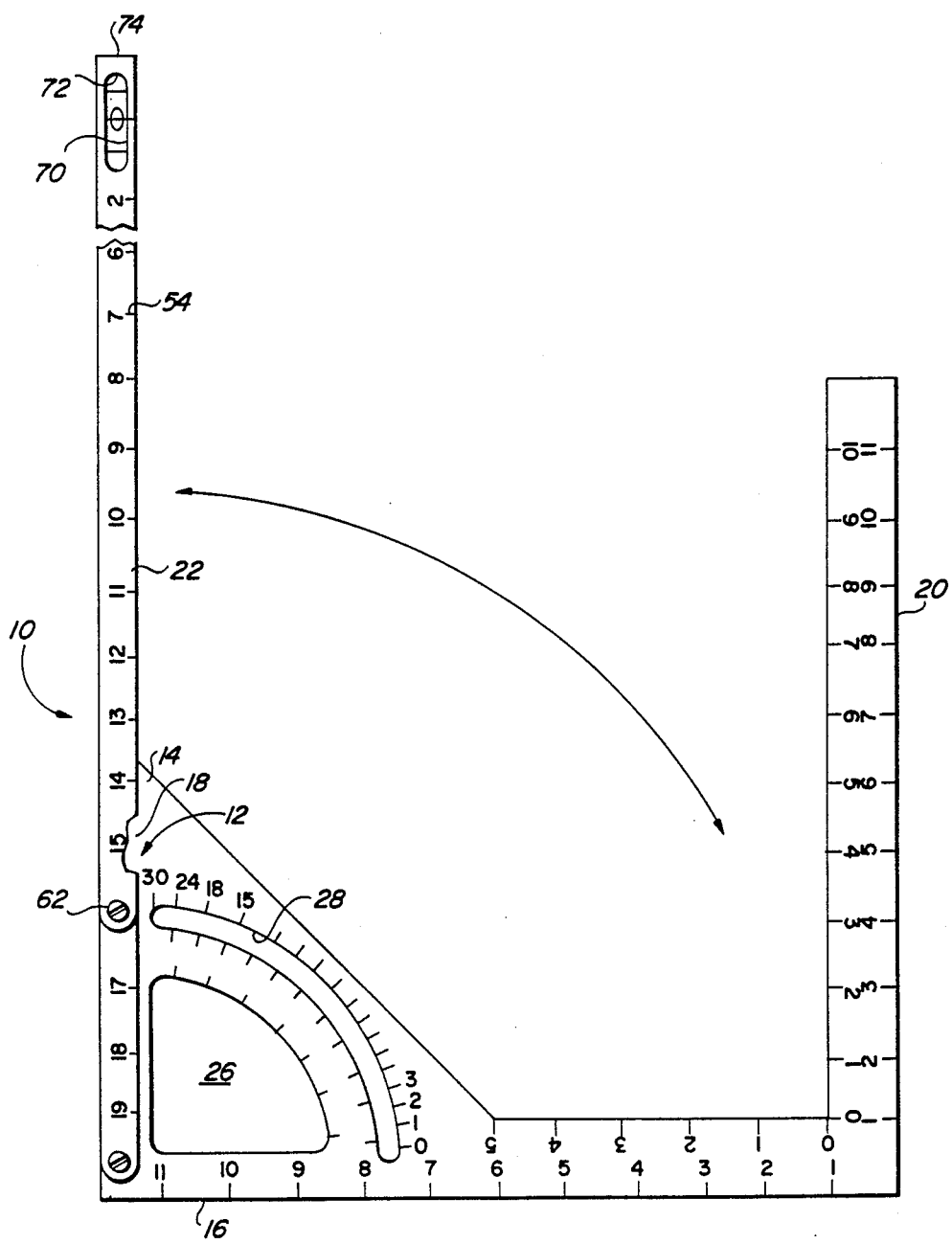

A preferred embodiment of the improved rafter measuring device of the present invention is schematically depicted in FIGS. 1–3. Thus, device 10 is shown, which comprises a body 12 in the form of a generally U-shaped flat plate 14 with a horizontal base 16 and first and second vertical arms 18 and 20 on opposite ends thereof. Plate 14 may be of aluminum, steel, stainless steel or other metal, or plastic, wood, ceramic, or other material. A third arm 22, which is pivotally connected to plate 14 adjoins the intersection of base 16 and arm 18, can also be made of the same or another stable material. Arm 22 is rotatable between an about horizontal position and a vertical position.

Arm 18 includes an expanded support position 24 which is preferably generally triangular, extending from the top of arm 18 to a point about midway along the length of base 16. Support portion 24 includes a spaced pair of curved slots 26 and 28 therein. Slot 26 is generally triangular, with curved perimeter 30 thereof bearing spaced marks or indicia 32 which indicate the angle in degrees from the horizontal. Indicia 34 are spaced along one side of slot 28 to indicate common jack plumb cut angles, while indicia 36 spaced along the opposite side of slot 28 indicate hip rafter valve angles.

Lines 38 and 44 on portion 24 are indicia indicating, respectively, common door sill and window sill angles. Arm 18 bears on the outer periphery thereof linear marks 42 in fractions of an inch and on the sloped inner periphery of portion 24 indicia 44 indicating the angles 90°, 80° and 70°. Base 16 bears linear indicia 46 in fractions of an inch on the lower periphery thereof and similar linear indicia 48 on the upper periphery thereof, while arm 20 bears similar linear indicia 50 and 52 on, respectively, the inner and outer perimeter thereof. Finally, arm 22 bears similar linear indicia 54 in fractions of an inch on one perimeter thereof.

Arm 18 and portion 24 thereof may also include a plurality, for example, three holes 56, 58 and 60 enabling arm 22 to be pinned, releasably thereof, as by threaded bolt 62 extending through arm 22.

Arm 22 can include a longitudinal slot (FIG. 2) along the length thereof, which slot slideably receives plate 14, that is, arms 18 and 20. When it is desired to lock arm 22 to plate 14, either holes 56, 58 or 60 can be used, or slot 28 can be used. In FIG. 1, threaded bolt 62 is shown in a position wherein it extends transversely through threaded openings (not shown) in arm 22 and through slot 28, releasably pinching side portions 68 of arm 22 against plate 14.

It will be noted that bubble level 70 is disposed in a cage 72 mounted in the free end 74 of arm 22 so that level 70 can be viewed from the top, bottom and sides thereof.

As shown in FIG. 1 and as previously described, device 10 can be used to measure a rafter angle by first placing device 10 on the top of roof 76, with base 16 abutting roof 76 and then moving arm 22 into a horizontal position. Arm 22 can then be releasably locked in that position by bolt 62 and the rafter angle can be read from indicia 32 on perimeter 30 of portion 24. Door sill angle and window angle lines 38 and 40 can be used in a similar fashion.

When it is desired to use device 10 as a vertical box measure, arm 22 is locked into the vertical position shown in FIG. 3, so that vertical arms 22 and 20 form opposite sides of the box, with horizontal base as the bottom of the box for esimating the squareness of a structure. Various other carpentry uses of device 10 will be apparent from the marked indicia on plage 14. All the above is accomplished without resorting to separate unwieldly level devices, since level 70 is incorporated directly into arm 22.

Device 10 is simple, durable and efficient. It can be made in various sizes and with various indicia marked on it. Bolt 62 can, if desired, be used to releasably lock arm 22 to arm 20 through supplemental openings (not shown) which may be provided in arm 20 and arm 22.

Various other modifications, changes, alterations and additions can be made in the improved rafter angle measuring device of the present invention, its components and their parameters. All such modifications, changes, alterations and additions as are within the scope of the appended claims form part of the present invention.

What is claimed is:

1. An improved rafter angle measuring device, said device comprising, in combination:
   (a) a body comprising a generally U-shaped plate having a horizontal base, to opposite ends of which are connected vertical extending spaced, parallel first and second arms, said first arm including a generally sloping support portion extending from the upper portion of said first arm to about the middle portion of the length of said base; and,
   (b) a third arm pivotally connected at one end thereof to said plate at about the intersection of said first arm and said base, the opposite end of which extends beyond said second arm, said third arm bearing a level and means releasably securing said third arm at a desired angle to said plate, said third arm being pivotable between a vertical position abutting said first arm and an about horizontal position adjacent said base.

2. The improved device of claim 1 wherein said support portion of said first arm is generally triangular and bears indicia for indicating the angle of said third arm relative to said base.

3. The improved device of claim 2 wherein said triangular portion is cut away in an arc to releasably receive said means for releasably securing said third arm thereto.

4. The improved device of claim 3 wherein said level is disposed in a cage in said third arm and is viewable from above, below and to the sides thereof.

5. The improved device of claim 4 wherein at least one of the inner and outer margins of each of said arms and said base bear linear measuring indicia.

6. The improved device of claim 5 wherein said generally triangular portion bears indicia indicating door sill and window sill angles, common jack plumb cuts and hip rafter valves.

7. The improved device of claim 6 wherein said generally triangular portion is cut away to provide a spaced pair of curved slots bordered by said angle, hip rafter valve and common jack plumb cut indicia.

8. The improved device of claim 7 wherein said third arm has a longitudinal slot extending substantially the length thereof through which said first and second arm are releasably received.

9. The improved device of claim 8 wherein said body is integral, wherein said body and third arm comprise metal and wherein said releasable securing means comprise a threaded lock nut extending transversely through said third arm and longitudinal slot, as well as one of said curved slots.

* * * * *